Oct. 18, 1932.        T. P. CHASE        1,883,556
BRAKE SHOE
Filed Aug. 1, 1927        5 Sheets-Sheet 1
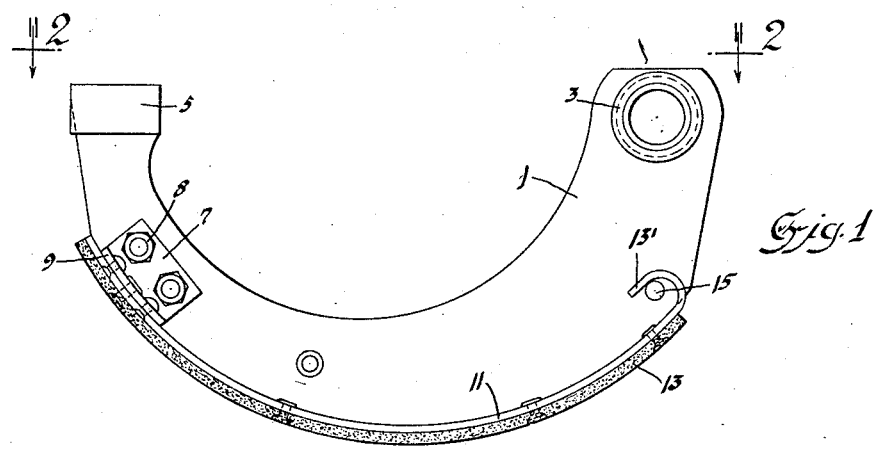
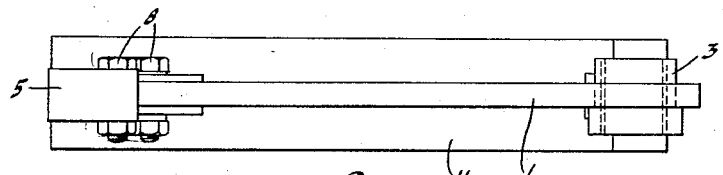
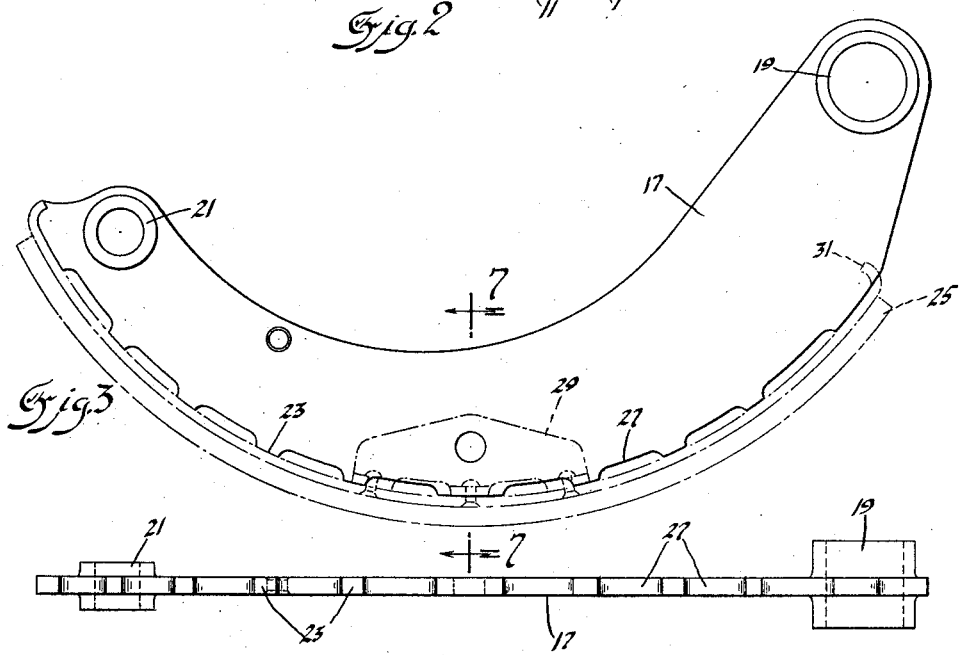
Inventor
Theron P. Chase
By Blackmore, Spencer, & Hiite
Attorneys

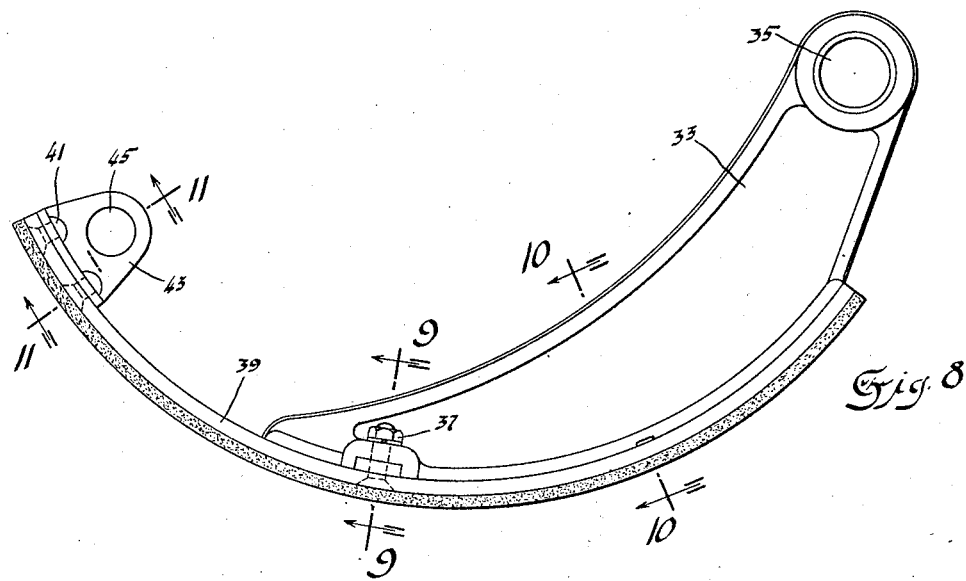
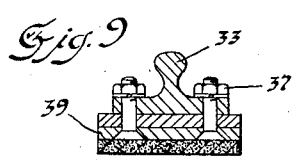
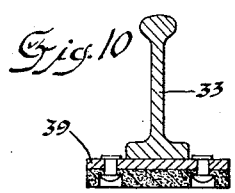
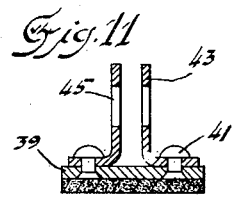
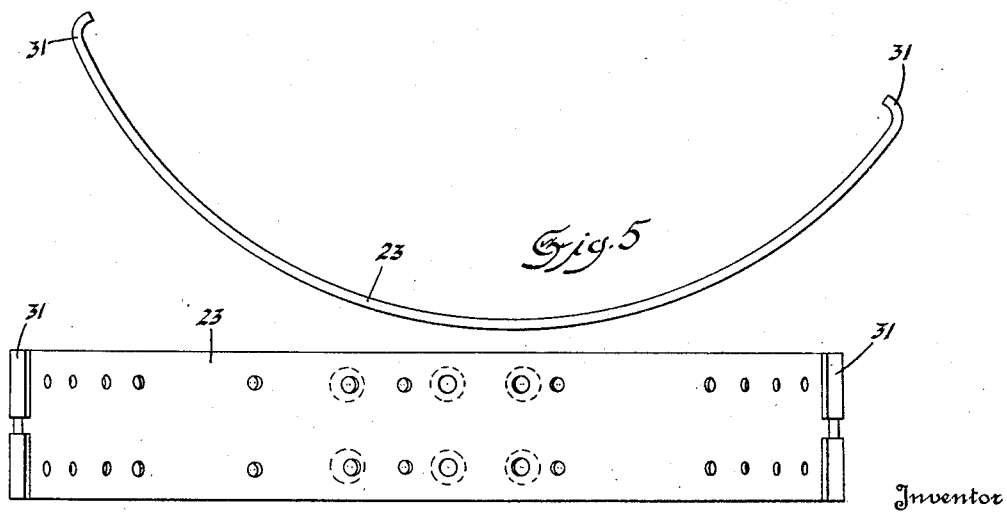
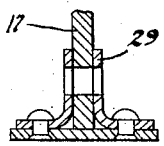

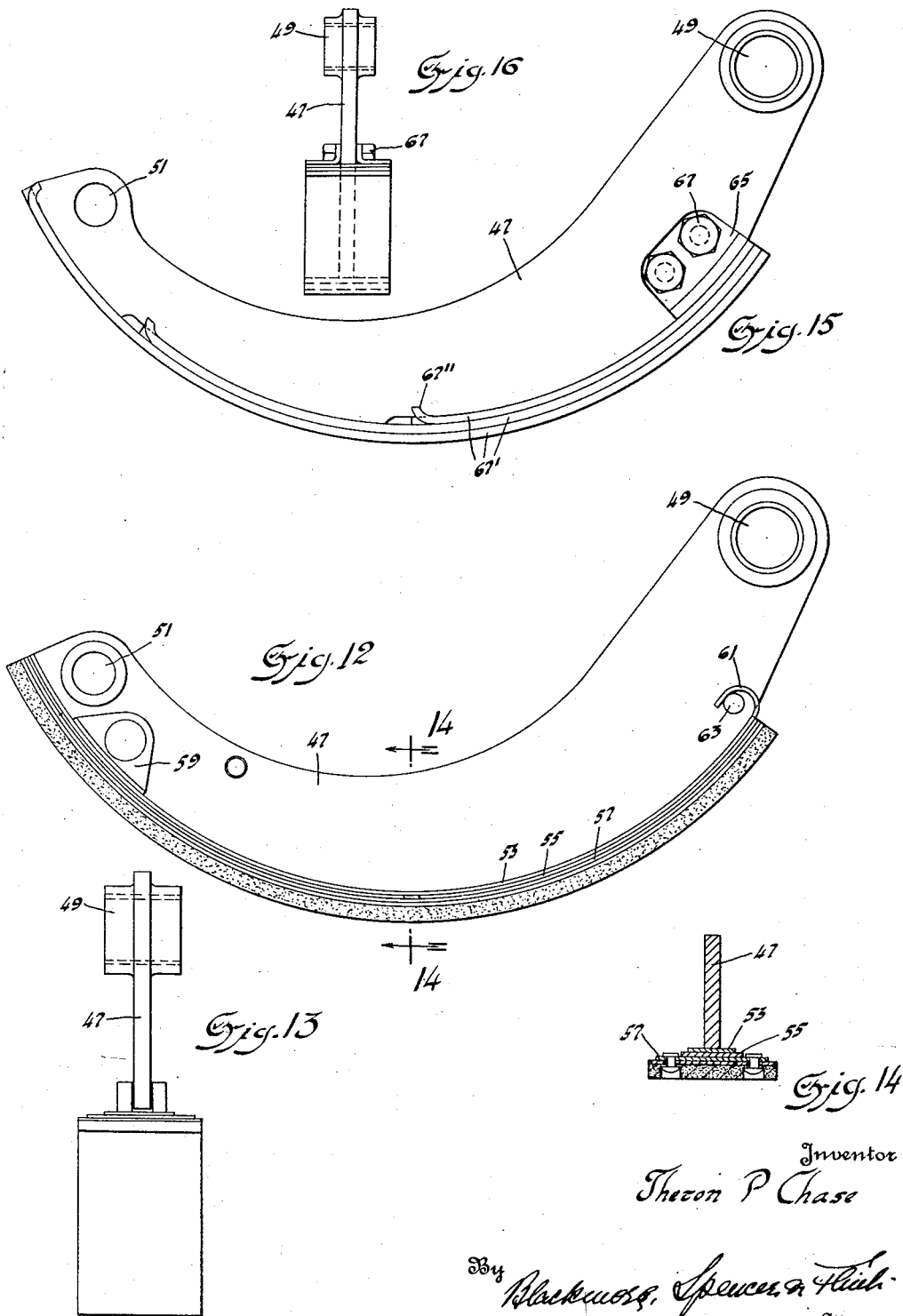

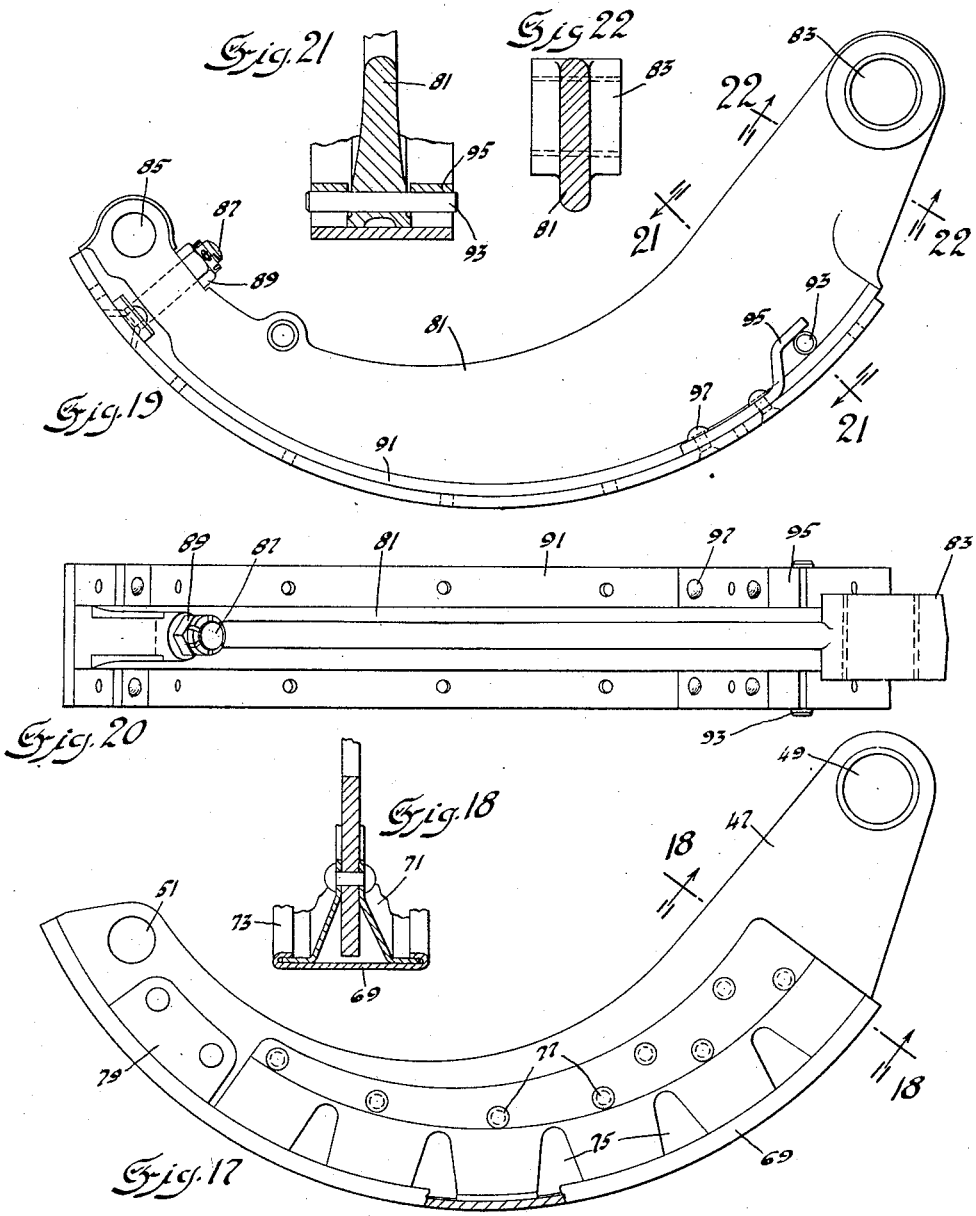

Oct. 18, 1932.  T. P. CHASE  1,883,556
BRAKE SHOE
Filed Aug. 1, 1927   5 Sheets-Sheet 5
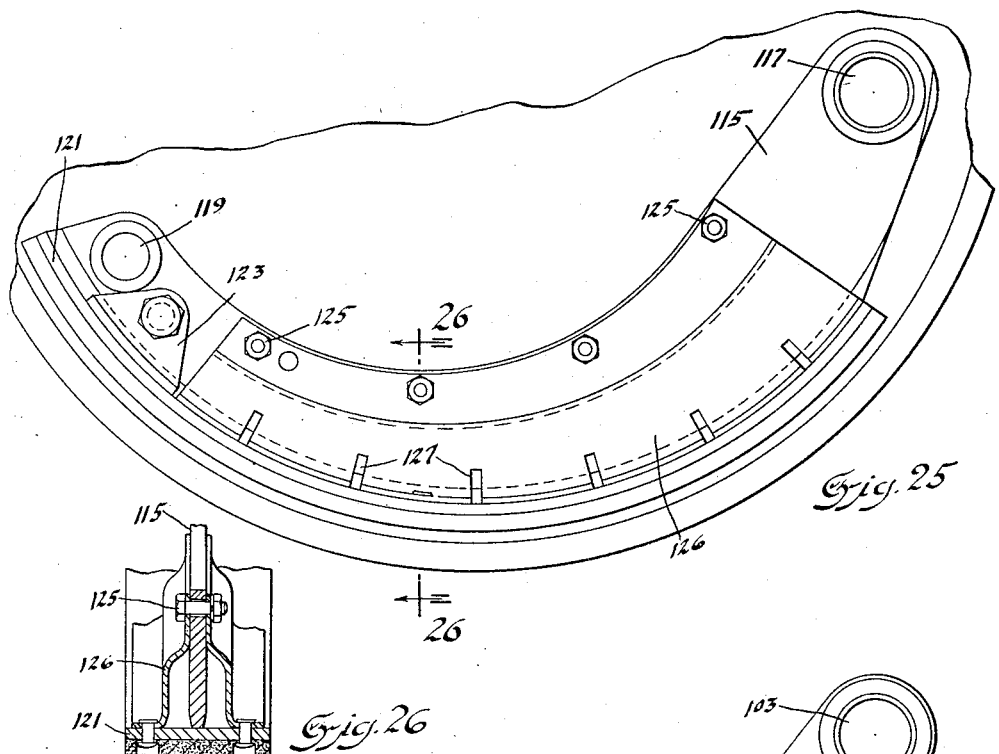
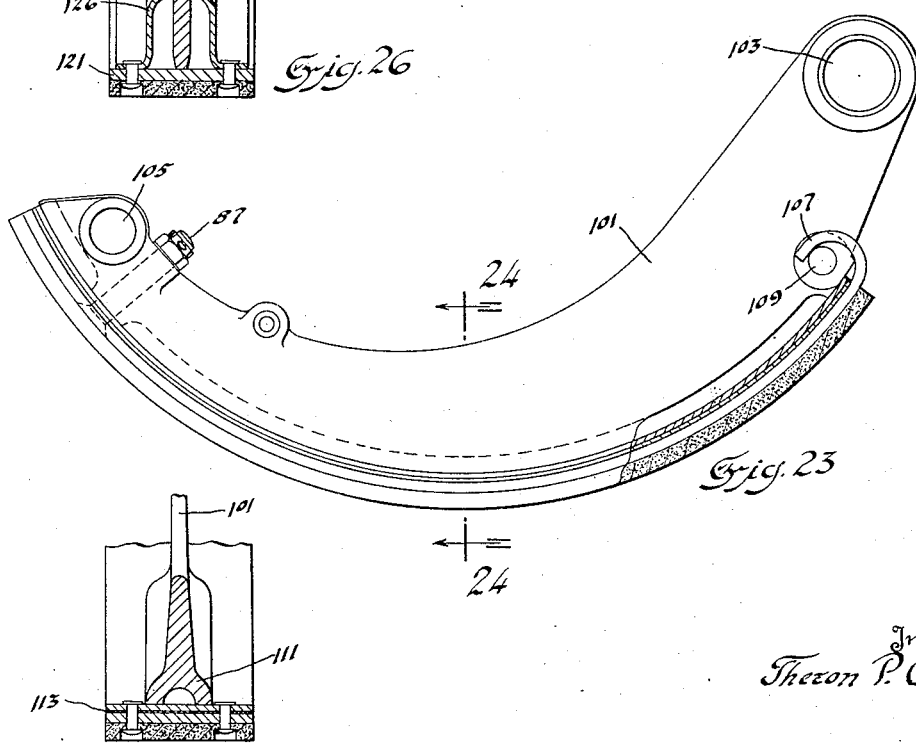
Inventor
Theron P. Chase
By Blackmore, Spencer & Hulse
Attorneys Patented Oct. 18, 1932

1,883,556

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

BRAKE SHOE

Application filed August 1, 1927. Serial No. 209,843.

This invention relates to brakes and more particularly to the rigid shoe type of brake.

The object of the invention is to avoid the effects of heat conditions tending to change the actuation characteristics of the rigid shoes.

Another object is to avoid the existence of differences in temperatures between the outer or lining portion of the beam of the rigid shoe and the inner portion of the beam.

Another object is to prevent the heat generated by friction from reducing the radius of curvature of the rigid shoe beam.

Other objects and advantages derived from the structure of my novel brake shoe will be understood from a reading of the following explanation and upon examination of the accompanying drawings.

The drawings show several forms in which the inventive idea may be embodied.

Figure 1 shows a side elevation of the rigid brake shoe.

Figure 2 is a plan view of line 2—2 of Figure 1.

Figure 3 is a side elevation of a second embodiment of the invention.

Figure 4 is an edge view of the beam, the lining carrying flange being removed.

Figure 5 is a view in side elevation of the lining carrying flange.

Figure 6 is a plan view of the same.

Figure 7 is a section on line 7—7 of Figure 3.

Figure 8 is a side elevation of another brake shoe in which the inventive idea may be embodied.

Figures 9, 10 and 11 are sections on lines 9—9, 10—10, 11—11 of Figure 8.

Figure 12 shows a side elevation of another modified form.

Figure 13 is a view in end elevation of the same.

Figure 14 is a section on line 14—14 of Figure 12.

Figure 15 is a view in side elevation of still another modification.

Figure 16 is an end elevation of the brake shoe of Figure 15.

Figure 17 shows a modified form of brake shoe showing a heat distributing arrangement.

Figure 18 is a section on line 18—18 of Figure 17.

Figure 19 shows a side elevation and another modified form of brake shoe.

Figure 20 is a plan view of the same.

Figures 21 and 22 are sectional views on lines 21—21, 22—22 of Figure 19.

Figure 23 is a side elevation of another form of brake shoe.

Figure 24 is a section through the same on line 24—24.

Figure 25 represents a side elevation of a brake shoe mounted in a drum, provision being made for increasing the radius of curvature of the shoe to conform with increased diameter of the drum, and Figure 26 is a sectional line 26—26 of Figure 25.

In development work in connection with rigid shoe brakes engaging the internal surfaces of rotating brake drums it has been found desirable to introduce structural features to prevent the heat developed by friction from interfering with actuating characteristics of such shoes.

In the following descriptive matter the term "self-actuation" is used to designate the force exerted by the rotating drum upon the shoe tending to turn the shoe about its pivot anchor. When the self-actuating force becomes sufficient to cause the shoe to so grip the drum as to be locked thereto with the result that the wheel no longer rotates, the force is said to be self-locking. The self-actuating force—the force tending to rotate the shoe derived from the rotating drum—varies at points along the arc of the shoe. The proportion between any existing self-actuating force and such a self-actuating force as would tend to lock the shoe to the drum is designated as "the self-actuating factor."

The brake shoe as ordinarily formed is composed of a curved beam pivotally anchored at one end to a fixed plate and provided with means for engagement with a cam or other actuating instrumentality at its other end. Heat developed by the frictional engagement of the drum expands the drum to a somewhat greater diameter. The heat which flows through the lining into the shoe heats that part of the shoe beam adjacent the lining so that it is very much hotter than the inner part of the beam away from the lining. This causes the shoe to curl and take a form having a shorter radius, the extent of such shortening being dependent upon the heat developed. This results in changing the range of contact between the lining and the drum. No longer is the whole arc of the lining in frictional contact with the drum but only a short part of the arc at, or, slightly back from the center of the shoe. At this position along the arc the self-actuation factor is much less than the desired actuation for which the shoe is designed. The lining is excessively worn at the portion near the heel. As the brake cools it returns to its original shape. When, then, the brake is applied, the extremity of the shoe engages the drum without there being contact along that portion adjacent the heel. At the extremity the actuation factor is high. Under such circumstances the shoe may be self-locking.

To obviate such defects of brake action this invention aims to prevent the development of excessive self-actuation. One means directed to the accomplishment of this object may be the introduction of heat insulating instrumentalities between the excessively hot lining and the shoe beam. Another method consists in so distributing the heat received by the beam that the beam shall not be curled. I may even so distribute the heat received by the beam as to increase its radius of curvature to correspond with the increased radius of curvature of the drum under the influence of heat caused by frictional contact with the shoes. The lining or the lining carrying portion may be so connected to the beam as to permit its free linear expansion without distorting the beam itself. The shoe may have its rigidity limited in extent so that it may not become self-locking under excessive heat.

The several expedients are shown in the several figures of the drawings. In Figure 1 there is illustrated a shoe for engagement with a brake drum, not shown. The shoe consists of a curved beam 1 having an eye 3 which is intended to pivotally mount the shoe beam upon a fixed plate adjacent the brake drum. The latter may be carried by the rotating wheel, the motion of which should be checked. At the other end the brake beam is provided a portion 5 which is to be engaged by a conventional cam carried on a camshaft and in the usual practice, rotatably mounted in the same plate which carries the pivotal mounting for the shoe. Near the toe portion of the shoe 1 and on either side of the beam, angle plates 7 are secured by fastening means 8. To the divergent faces 9 of the angle plates are secured by suitable fastening means a flange 11, which flange is preferably provided with a brake lining 13 of suitable character and having a desired coefficient of friction. At the end of the flange 11 adjacent the heel portion of the brake beam the said flange is provided with an axial slot and the material on either side of the slot is bent into the form of a hook as at 13', the two hooked portions 13' engaging a pin 15 carried by the shoe beam. When the shoe is engaged with the drum the frictional engagement of the lining 13 produces a considerable heat. If both ends of the flange 11 were fixed to the shoe beam this considerable heat on the outside of the beam being much greater than the heat on the inner portion of the beam would result in the curling of the beam giving it a shorter radius with the disadvantageous operation which has been described above. By securing the flange 11 at one end only, when heated it is permitted to expand in a linear direction along the outer surface of the beam 1, being retained from radial movement relative to the beam by the parts 13' and 15.

In Figure 3 is shown a shoe having a beam 17 provided with a pivotal eye 19. At the other end of the beam is an eye 21 for engagement with any suitable brake operating means. This form of the invention is provided with a flange 23 carrying a lining 25. It will be observed that the edge of the beam 17 engaged by the flange 23 has notched out portions 27 whereby the heat is prevented to a considerable extent from passing from the lining 25. At about the middle portion of the beam 17 there are secured on opposite sides of the beam angle plates 29 to the flat faces of which is fastened the flange 23. The ends of the flange are slotted and the material on each side of the slot is turned up as at 31 to engage the opposite sides of the beam portion 17. In this form of the invention it will be seen that provision is made to prevent the heat resulting from the frictional engagement of the lining with the drum from passing to the beam. Provision is also made whereby the linear expansion of the flange 23 carrying the lining 25 may take place without the beam 17 being curled up and given a shorter radius.

In Figures 8, 9, 10 and 11 the difficulties which this invention aims to overcome have been obviated in a different manner. In this case there is shown a shoe 33 provided with a pivotal eye portion 35. The shoe has secured thereto by fastening means 37 adjacent its toe portion a flange or lining carrying member 39. It will be observed that the lining carrying portion or flange 39 extends considerably beyond the toe portion of the shoe. At the end of the flange 39 there are secured by suitable fastening means 41 angle plates 43 apertured as at 45, this construction being to provide for suitable operating means for the brake shoe.

In this form of the invention it is the intention to make the forward or self-locking portion of the shoe flexible enough so that it will not be self-locking after wear has taken place at the center and heel portions. Approximately ⅓ of the shoe is made flexible and the balance of the shoe is made rigid. By making the shoe in this way the forward or toe portion is self-actuating in proportion to the applied effort and self-actuation does not increase materially if the lining wears more at the center and heel than at the toe. The length of the rigid shoe portion 33 is such that self-locking cannot occur at its toe portions.

In Figure 12 is shown a form of brake shoe wherein an effort has been made to insulate the beam portion 47 from the lining. The contour of the beam is much the same as in forms already described, it being provided with a pivotal eye 49 and with an eye 51 for connection with operating means. Instead of using a single layer of material for the flange, several layers of steel are used which together will have a lower heat transfer value than if the flange portion were made all of one piece. The several layers are represented by reference characters 53, 55 and 57. The layers may be secured together in any way preferred. The space between the several layers will have a relatively high resistance to heat flow. In this form of the invention the lining carrying flange may be secured by angle plates 59 near the toe end of the shoe, and at the other end hooked portions 61 may slidingly engage a pin 63 carried by the shoe beam, this arrangement permitting linear expansion of the flanging without distortion of the beam.

Somewhat the same idea underlies the construction shown in Figures 15 and 16. In this form of the invention the shoe beam is represented by reference characters 47 as in the case of Figure 12. The beam eye is represented by No. 49 and the eye portion 51 is the same as the corresponding eye in Figure 12. Angle plates 65 are secured by a fastening means 67 to opposite sides of the beam 47 to carry the flange provided with a lining. In this form of the invention the flange portion is also made of several laminations of steel similarly secured together and for the same purpose as was explained in connection with Figure 12. In this case, however, more laminations are used at the heel portion of the shoe where the beam is wider and, therefore, where the temperature difference may be greater on account of the distance the heat must flow to reach the inside edge. The heat should be kept from passing into the beam to as great an extent as possible. The heat which does pass into the beam should be conducted to the inner edge of the beam as quickly as possible. This last-named distribution is less efficient in the case of the wider portion of the beam. For this reason additional precaution in the form of added insulating layers is used adjacent the wider region. It will be seen for example that three laminations 67' extend from a point near the heel of the shoe. The inner one of these laminations has turned up ends as at 67" at a point intermediate the length of the shoe. From this point there extend two laminations one of which ends at a point toward the toe end of the shoe and the third lamination continues to the end of the shoe.

In Figures 17 and 18 is shown another form particularly directed to the insulation of the outer boundary of the beam from the heated flange, and also to the distribution of the heat from the flange to the beam. In this form of the invention the brake beam may be designated by numeral 47 with an eye 49 for pivotal connection and an eye 51 for connection with operating means. The beam 47 is shown spaced from the flange 69 thereby providing an air space between the beam and the flange so that the heated flange cannot readily transmit its heat to the beam. Struts 71 are used to connect the flange and beam, these struts being conveniently carried by the flange as shown in Figure 18 where the end portions of the flange 69 are turned over as at 73 to engage the ends of the struts. The struts may also be slotted as shown at 75. They are secured to the beam at a point near or within the neutral axis of the beam so that the heat which they transmit from the flange to the beam will have a neutral effect on the shape of the beam portion of the shoe. The fastening means between the struts and the beam is represented by reference character 77. With a shoe of this kind the heat from the flange is kept in a large measure from the adjacent portion of the beam and such heat as is given to the beam is distributed to it in a way to prevent its distortion. At a point near the toe end the flange may be secured to the beam by angle plates 79.

Figures 19 to 22 inclusive illustrate another form of the invention in which the flange portion is keyed and bolted to the beam portion so that the flange and its lining may be quickly removed for service. In this form of the invention the beam is represented by reference character 81, its pivotal eye 83 and at its opposite end is an eye 85 for engaging with the operating means. Near the toe end of the beam of the shoe a bolt 87 is used together with a nut 89 to secure the flange 91 to the beam. This bolt passes through a suitable aperture in the beam portion. Toward the heel end of the beam is a pin 93 projecting on each side of the beam. The ends of this pin are slidably engaged by plates 95 secured by rivets or the like 97 to the flange on each side of the beam. Figure 22 shows that the beam adjacent the pivot 83 is of uniform thickness but from Figure 21 it will be observed that the beam thickness increases from its inner portion toward the flange engaging edge. By this means the heat from the flange can better flow to the inside of the shoe and thus balance the temperature difference between the outside and inside quickly and thus materially lessen the time interval in which undesirable wear can take place.

In Figures 23 and 24 is shown a form of the invention where insulation provision of a somewhat different kind is provided. In this form of the invention the beam is represented by numeral 101, its eye for pivotal connection by numeral 103, and 105 is the eye at the toe end for connection with operating means. As in the case of Figure 19 the flange is secured by a fastening bolt 87 at the end near the toe. At the opposite end the flange is slotted and the material on each side of the slot is formed into a hook 107 to engage a pin 109, this provision permitting extension without tendency to distort the beam. The beam itself is shown as of increasing thickness toward the flange and at the flange is forked as shown by numeral 111 in Figure 24. By this fork construction the heat is quite readily carried away from the flange portion of the beam toward the thinner edge. Perhaps more important, this form of the invention provides quite adequate means to insulate the beam from the heat of the flange. The flange is formed of three laminations the center of which 113 is preferably of mica which has a relatively low heat conductivity value. In this way less heat will be transferred to beam of the shoe.

In Figures 25 and 26 is illustrated a form of the invention which has been designed not only to prevent the shortening of the radius of curvature of the shoe but with the deliberate purpose of lengthening the radius of curvature so that it may conform to the increased diameter of the brake drum due to the heating of the latter. In this form of the invention I have represented the beam by reference numeral 115. The beam has an eye 117 for pivotal connection with the fixed plate and an eye 119 at the toe end for connection with suitable operating means. The flange 121 is connected by angle plates 123 to the beam as in forms of the invention previously described. For the purpose of preventing the flange engaging portion of the beam from receiving any considerable heat from the flange the beam is given a reduced area of contact with the flange portion as well illustrated in Figure 26. On each side of the beam are secured by suitable fastening means 125 copper conductors 126. These conductors are flared out from their fastening means as shown in Figure 26 and the flattened ends carry the flange 121. These flared portions may be slotted as at 127. It will be observed that the copper conductors contact with the beam only at that portion of the beam near its inner boundary. The heat which is transmitted from the flange to the beam therefore tends to heat the inner portion of the beam more than the outer with the result that the shoe as a whole tends to flatten and have a longer radius. By this means the shoe is intended to follow up the increasing diameter of the drum as the latter becomes heated.

The above several expedients illustrate some of the ways in which a rigid shoe may be provided with means to prevent the effects of heat from distorting its shape and from interfering with its predetermined actuating characteristics. It will be readily understood that other and similar arrangements may be provided and this invention is intended to cover such other arrangements as fall within the terms of the appended claim.

I claim:

In a brake, a shoe comprising a swinging beam and a flange, plates of good heat conductivity connecting said flange to said beam at positions on beam remote from said flange, and said beam having a reduced area of contact at its point of engagement with said flange.

In testimony whereof I affix my signature.

THERON P. CHASE.